US008455423B2

(12) United States Patent
Hage et al.

(10) Patent No.: US 8,455,423 B2
(45) Date of Patent: Jun. 4, 2013

(54) PROCESS OF BLEACHING

(75) Inventors: Ronald Hage, Vlaardingen (NL); Jean Hypolites Koek, Vlaardingen (NL); Marinus Maria Cornelis Gerardus Warmoeskerken, Delft (NL)

(73) Assignee: Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 13/177,458

(22) Filed: Jul. 6, 2011

(65) Prior Publication Data

US 2011/0275510 A1 Nov. 10, 2011

Related U.S. Application Data

(62) Division of application No. 11/920,787, filed as application No. PCT/EP2006/004260 on Apr. 26, 2006, now abandoned.

(30) Foreign Application Priority Data

May 27, 2005 (EP) .................................... 05253295

(51) Int. Cl.
*C11D 7/26* (2006.01)
*C11D 7/32* (2006.01)
*C11D 7/54* (2006.01)

(52) U.S. Cl.
USPC ........... 510/303; 510/311; 510/372; 510/376; 510/499; 510/505; 252/186.28; 252/186.41; 502/200; 502/324; 502/325

(58) Field of Classification Search
USPC ...... 510/303, 311, 372, 376, 499, 505; 8/111, 8/137; 252/186.28, 186.41; 502/200, 324, 502/325
See application file for complete search history.

(56) References Cited

U.S. PATENT DOCUMENTS

| 5,153,161 | A | 10/1992 | Kerschner et al. |
| 5,256,779 | A | 10/1993 | Kerschner et al. |
| 5,274,147 | A | 12/1993 | Kerschner et al. |
| 5,329,024 | A | 7/1994 | Jureller et al. |
| 5,356,654 | A | 10/1994 | Speirs et al. |
| 5,429,769 | A | 7/1995 | Nicholson et al. |
| 5,516,738 | A | 5/1996 | Jureller et al. |
| 6,087,312 | A | 7/2000 | Masotti et al. |
| 6,432,900 | B1 * | 8/2002 | Appel et al. .................. 510/376 |
| 7,972,386 | B2 | 7/2011 | De Almeida et al. |
| 7,976,582 | B2 | 7/2011 | De Almeida et al. |
| 2001/0025695 | A1 * | 10/2001 | Patt et al. ......................... 162/72 |
| 2002/0010120 | A1 | 1/2002 | Hage et al. |
| 2002/0066542 | A1 | 6/2002 | Jakob et al. |
| 2002/0160925 | A1 * | 10/2002 | Hage et al. .................... 510/311 |
| 2003/0040459 | A1 | 2/2003 | Araya et al. |
| 2005/0137105 | A1 | 6/2005 | Griese et al. |
| 2005/0137118 | A1 | 6/2005 | Silveri |
| 2006/0277687 | A1 | 12/2006 | Buhler et al. |
| 2009/0205143 | A1 | 8/2009 | Hage et al. |

FOREIGN PATENT DOCUMENTS

| EP | 0458398 | 5/1991 |
| EP | 0458397 | 11/1991 |
| EP | 0509878 | 4/1992 |
| EP | 0530870 | 7/1992 |
| EP | 0 544 491 | 11/1992 |
| EP | 0544490 | 11/1992 |
| WO | WO 95/27773 | 10/1995 |
| WO | WO 97/44520 | 11/1997 |
| WO | WO 01/64697 | 9/2001 |
| WO | WO 01/64993 | 9/2001 |
| WO | WO 02/064721 | 8/2002 |
| WO | WO 02/088063 | 11/2002 |
| WO | WO 2005/033070 | 4/2005 |
| WO | WO 2006/125517 | 11/2006 |

OTHER PUBLICATIONS

EP Search Report in EP Application No. EP 05 25 329, Nov. 2005.
PCT International Search Report in PCT Application No. PCT/EP2006/004260 mailed Jul. 28, 2006.
Hage et al., "Efficient Manganese Catalysts for Low-Temperature Bleaching", Nature, Jun. 23, 1994, vol. 369, pp. 637-639.
I Garcia-Bosch et al. (Organic Letters, 2008, 10, 2095-2098).
BC Gilbert et al. (Org. Biomol. Chem., 2003, 1, 1568-1577).
BC Gilbert et al. (J. Mol. Catal. A, 2004, 219(1), 265-272).
BC Gilbert et al. (Org. Biomol. Chem., 2004, 2, 1176-1180).
R Hage et al. (Nature, Jun. 23, 1994, 369, 637-639).
G Reinhardt (J. Mol. Catal. A: Chemical, 2006, 251, 177-184).
T Wieprecht et al. (J. Surfactants and Detergents, 2004, 7(1), 59-66).

* cited by examiner

*Primary Examiner* — Gregory Delcotto
(74) *Attorney, Agent, or Firm* — Knobbe, Martens, Olson & Bear, LLP

(57) ABSTRACT

An aqueous solution of a water soluble salt of a preformed transition metal catalyst together with hydrogen peroxide is disclosed. The composition is useful in bleaching a variety of substrates.

12 Claims, No Drawings

PROCESS OF BLEACHING

FIELD OF INVENTION

The invention concerns the use of bleaching solutions.

BACKGROUND OF THE INVENTION

Raw cotton (gin output) is dark brown in colour due to the natural pigment in the plant. The cotton and textile industries recognise a need for bleaching cotton prior to its use in textiles and other areas. The object of bleaching such cotton fibres is to remove natural and adventitious impurities with the concurrent production of substantially whiter material.

There have been two major types of bleach used in the cotton industry. One type is a dilute alkali or alkaline earth metal hypochlorite solution. The second type of bleach is a peroxide solution, e.g., hydrogen peroxide solutions. This bleaching process is typically applied at high temperatures, i.e. 80 to 95° C. Controlling the peroxide decomposition due to trace metals is key to successfully using hydrogen peroxide. Often Mg-silicates or sequestering agents such as EDTA or analogous phosphonates are applied to reduce decomposition. A problem with the above types of treatment is that the cotton fibre is susceptible tendering.

Wood pulp produced for paper manufacture either contains most of the originally present lignin and is then called mechanical pulp or it has been chiefly delignified, as in chemical pulp. Mechanical pulp is used for e.g. newsprint and is often more yellow than paper produced from chemical pulp (such as for copy paper or book-print paper). Further, paper produced from mechanical pulp is prone to yellowing due to light- or temperature-induced oxidation. Whilst for mechanical pulp production mild bleaching processes are applied, to produce chemical pulp having a high whiteness, various bleaching and delignification processes are applied. Widely applied bleaches include elemental chlorine, hydrogen peroxide, chlorine dioxide and ozone.

Whilst for both textile bleaching and wood pulp bleaching, chlorine-based bleaches are most effective, there is a need to apply oxygen-based bleaches for environmental reasons. Hydrogen peroxide is a good bleaching agent, however, it needs to be applied at high temperatures and long reaction times. For industry it is desirable to be able to apply hydrogen peroxide at lower temperatures and shorter reaction times than in current processes. Towards this end, the use of highly active bleaching catalysts would be desirable.

As a particular class of active catalysts, the azacyclic molecules have been known for several decades, and their complexation chemistry with a large variety of metal ions has been studied thoroughly. The azacyclic molecules often lead to transition-metal complexes with enhanced thermodynamic and kinetic stability with respect to metal ion dissociation, compared to their open-chain analogues.

United States Application 2001/0025695, discloses the use of a manganese transition metal catalyst of 1,4,7-Trimethyl-1,4,7-triazacyclononane ($Me_3$-TACN); the transition metal catalyst has as a non-coordinating counter ion $PF_6^-$. United States Application 2001/0025695A1 also discloses a manganese transition metal catalyst of 1,2,-bis-(4,7,-dimethyl-1,4,7,-triazacyclonon-1-yl)-ethane ($Me_4$-DTNE); the transition metal catalyst has as a non-coordinating counter ion $ClO_4^-$. The solubility, in water at 20° C., of the $Me_4$-DTNE complex having non-coordinating counter ion $ClO_4^-$ is about 16 gram/Liter. The solubility, in water at 20° C., of the $Me_4$-DTNE complex having non-coordinating counter ion $PF_6^-$ is about 1 gram/Liter.

US 2002/0066542 discloses the use of a manganese transition metal complex of $Me_3$-TACN in comparative experiments and makes reference to WO 97/44520 with regard to the complex; the non-coordinating counter ion of the manganese transition metal complex of $Me_3$-TACN is $PF_6^-$. The X groups as listed in paragraph [021] of US 2002/0066542 are coordinating.

EP 0458397 discloses the use of a manganese transition metal complex of $Me_3$-TACN as bleaching and oxidation catalysts and use for paper/pulp bleaching and textile bleaching processes. $Me_3$-TACN complexes having the non-coordinating counter ion perchlorate, tetraphenyl borate ($BPh_4^-$) and $PF_6^-$ are disclosed. The solubility, in water at 20° C., of the $Me_3$-TACN complex having non-coordinating counter ion $ClO_4^-$ is between 9.5 to 10 gram/Liter. The solubility, in water at 20° C., of the $Me_3$-TACN complex having non-coordinating counter ion $BPh_4^-$ is less then 0.01 gram/Liter.

WO 95/27773 discloses the use of manganese transition metal catalysts of 1,4,7-Trimethyl-1,4,7-triazacyclononane ($Me_3$-TRCN); the transition metal catalysts have as a non-coordinating counter ion $ClO_4^-$ and $PF_6^-$.

1,4,7-Trimethyl-1,4,7-triazacyclononane ($Me_3$-TACN) has been used in dishwashing for automatic dishwashers, SUN™, and has also been used in a laundry detergent composition, OMO Power™. The ligand ($Me_3$-TACN) is used in the form of its manganese transition-metal complex, the complex having a counter ion that prevents deliquescence of the complex. The counter ion for the commercialised products containing manganese $Me_3$-TACN is $PF_6^-$. The $Me_3$-TACN $PF_6^-$ salt has a water solubility of 10.8 g per litre at 20° C. Additionally, the perchlorate ($ClO_4^-$) counter ion is acceptable from this point of view because of its ability to provide a manganese Me3-TACN that does not appreciably absorb water. Reference is made to U.S. Pat. No. 5,256,779 and EP 458397, both of which are in the name of Unilever. One advantage of the $PF_6^-$ or $ClO_4^-$ counter ions for the manganese $Me_3$-TACN complex is that the complex may be easily purified by crystallisation and recrystallisation from water. In addition, for example, the non-deliquescent $PF_6^-$ salt permits processing, e.g., milling of the crystals, and storage of a product containing the manganese $Me_3$-TACN. Further, these anions provide for storage-stable metal complexes. For ease of synthesis of manganese $Me_3$-TACN highly deliquescent water soluble counterions are used, but these counterions are replaced with non-deliquescent, much less water soluble counter ions at the end of the synthesis. During this exchange of counter ion and purification by crystallisation loss of product results. A drawback of using $PF_6^-$ is its significant higher cost compared to other highly soluble anions.

U.S. Pat. Nos. 5,516,738 and 5,329,024 disclose the use of a manganese transition metal catalyst of 1,4,7-Trimethyl-1,4,7-triazacyclononane ($Me_3$-TACN) for epoxidizing olefins; the transition metal catalyst has as a non-coordinating counter ion $ClO_4^-$. U.S. Pat. No. 5,329,024 also discloses the use of the free $Me_3$-TACN ligand together with manganese chloride in epoxidizing olefins.

WO 2002/088063, to Lonza A G, discloses a process for the production of ketones using $PF_6^-$ salts of manganese $Me_3$-TACN.

WO 2005/033070, to BASF, discloses the addition of an aqueous solution of Mn(II) acetate to an aqueous solution of $Me_3$-TACN followed by addition of a organic substrate followed by addition of hydrogen peroxide.

Use of a water-soluble salt negates purification and provides a solution, which may be used directly, and reduces loss by purification.

SUMMARY OF INVENTION

We have found that there is an advantage in using a preformed transition metal complex of azacyclic molecules over in situ generation, for example by mixing the appropriate ligand with the $MnCl_2$, $MnSO_4$ or $Mn(OAc)_2$ salts in an industrial process. Further, the addition of one product to a reaction vessel reduces errors in operation.

We have found that for certain applications the use of a highly water-soluble salt of the manganese azacyclic complex is preferable. We have found that the dominant factor in the solubility of these transition metal complexes is the non-coordinating counter ion(s). In the solubilities given herein for ($Me_3$-TACN) the co-ordinating counter ions are three $O^{2-}$ and for $Me_4$-DTNE the co-ordinating counter ions are two $O^{2-}$ and one acetate.

The invention is particularly applicable to industrial bleaching of paper/pulp, cotton-textile fibres, and the removal or degradation of starches. By using a transition metal catalyst that is significantly water soluble the synthesis negates the preparation of significantly water insoluble salts and hence reduces cost. The transition metal catalyst may be shipped in solution or as a solid form of transition metal catalyst which is easily dissolved in water.

In order to avoid the use of costly non-coordinating counter ions required for isolation, formulation and stabilisation, one might form the transition metal catalyst in situ. U.S. Pat. No. 5,516,738 discloses the use of free $Me_3$-TACN ligand with Mn(II) $Cl_2$ in epoxidizing olefins. However the in situ preparation has some drawbacks, for example, it is a more complicated process and uncontrolled side reactions occur which result in less efficient formation of the catalyst and undesirable side products like $MnO_2$. Fast decomposition of hydrogen peroxide, catalysed by some of the undesirable side products might occur, reducing the efficiency of the bleach process.

In one embodiment the present invention provides a method of catalytically treating a substrate, the substrate being a cellulose-containing substrate or starch containing substrate, with a preformed transition metal catalyst salt, the preformed transition metal catalyst salt having a non-coordinating counter ion, the method comprising the following steps:

(i) optionally dissolving a concentrate or solid form of a preformed transition metal catalyst salt in an aqueous medium to yield an aqueous solution of the preformed transition metal catalyst salt;

(ii) adding the aqueous solution of the preformed transition metal catalyst salt to a reaction vessel; and, (iii) adding hydrogen peroxide to the reaction vessel, wherein the preformed transition metal catalyst salt is a mononuclear or dinuclear complex of a Mn (III) or Mn(IV) transition metal catalyst for catalytically treating the substrate with hydrogen peroxide, the non-coordinating counter ion of said transition metal catalyst selected to provide a preformed transition metal catalyst salt that has a water solubility of at least 30 g/l at 20° C. and wherein the ligand of the transition metal catalyst is of formula (I):

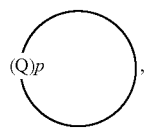

(I)

wherein:

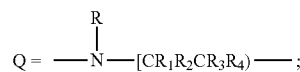

p is 3;
R is independently selected from: hydrogen, C1-C6-alkyl, $CH_2CH_2OH$, and $CH_2COOH$, or one of R is linked to the N of another Q via an ethylene bridge;
R1, R2, R3, and R4 are independently selected from: H, C1-4 -alkyl, and C1-C4-alkylhydroxy, and the substrate is bought into contact with a mixture of the aqueous solution of the preformed transition metal catalyst salt and the hydrogen peroxide. The dinuclear complex may have two manganese in same or differing oxidation states.

R is preferably C1-C6-alkyl, most preferably Me, and/or one of R is an ethylene bridge linking the N of Q to the N of another Q.

The reaction vessel may be part of a continuous flow apparatus or a vessel used in a batch process. Preferably pulp and cotton are treated in a continuous flow process. Steps (ii) and (iii) provide a mixture of the aqueous solution of the preformed transition metal catalyst salt and the hydrogen peroxide; the substrate is bought into contact with this mixture and hence is treated with such within the reaction vessel.

The preformed transition metal catalyst salt is one which has been provided by bringing into contact the free ligand or protonated salt of the free ligand and a manganese salt in solution followed by oxidation to form a Mn (III) or Mn(IV) transition metal catalyst. Preferred protonated salts of the ligand are chloride, acetate, sulphate, and nitrate. The protonated salts should not have undesirable counterions such as perchlorate or $PF_6^-$. The contact and oxidation step is preferably carried out in an aqueous medium, at least 24 hours before use, preferably at least 7 days before use.

The rate of formation of the transition metal catalyst depends upon the ligand. The formation of a transition metal catalyst from $Me_3$-TACN ligand is typically complete within 5 min. The formation of a transition metal catalyst from $Me_4$-DTNE ligand requires about 20 to 30 min for optimal complexation. After complex formation an aqueous solution of $H_2O_2$/NaOH may be slowly added to form a desired Mn(IV)/Mn(IV) or Mn(IV)/Mn(III) species. This second step, the oxidation step, provides a sufficiently stable complex for storage.

In another aspect the present invention provides the preformed transition metal catalyst salt as defined herein, wherein the preformed transition metal catalyst salt has been formed by a contact and oxidation step that is carried out at least 24 hours previously, preferably 7 days previously, and is stored in a closed, preferably sealed, container.

The present invention also extends to the substrate treated with preformed transition metal catalyst and hydrogen peroxide.

DETAILED DESCRIPTION OF THE INVENTION

The solubility, in water at 20° C., of the $Me_3$-TACN complex having non-coordinating counter ion acetate is more than 70 gram/Liter. The solubility, in water at 20° C., of the $Me_3$-TACN complex having non-coordinating counter ion sulphate is more than 50 gram/Liter. The solubility, in water at 20° C., of the $Me_3$-TACN complex having non-coordinating counter ion chloride is 43 gram/Liter. It is most preferred the preformed transition metal catalyst salt is a dinuclear Mn(III) or Mn(IV) complex with at least two $O^{2-}$ bridges.

The method of treating paper/pulp, cotton-textile fibres, or starch containing substrate is most applicable to industrial processes. Other examples of such processes are laundry or mechanical dish washing applications, fine chemical synthesis. Most preferably the method is applied to wood pulp, raw cotton, or industrial laundering. In this regard, the wood pulp is bleached which has not been processes into a refined product such as paper. The raw cotton is in most cases treated/bleached after preparation of the raw cotton cloths or bundled fibres. Preferably the method of treatment is employed in an aqueous environment such that the liquid phase of the aqueous environment is at least 80 wt % water, more preferably at least 90 wt % water and even more preferably at least 95 wt % water. After treatment of the substrate the reactants may be recycled back into the reaction vessel.

In addition, poly-cotton may also advantageously be treated in the form of a thread or a woven garment. Another preferred utility is in the industrial bleaching market of laundry, for example, the bleaching of large amounts of soiled white bed linen as generated by hospitals and gaols.

Preferably R is independently selected from: hydrogen, $CH_3$, $C_2H_5$, $CH_2CH_2OH$ and $CH_2COOH$; least preferred of this group is hydrogen. Most preferably R is Me and/or one of R is an ethylene bridge linking the N of Q to the N of another Q. Preferably R1, R2, R3, and R4 are independently selected from: H and Me. Preferred ligands are 1,4,7-Trimethyl-1,4,7-triazacyclononane ($Me_3$-TACN) and 1,2,-bis-(4,7-dimethyl-1,4,7,-triazacyclonon-1-yl)-ethane ($Me_4$-DTNE) of which $Me_3$-TACN is most preferred. The manganese ion is most preferably Mn(III) or Mn(IV), most preferably Mn(IV).

The water solubility of the preformed transition metal catalyst salt is at least 30 g/l at 20° C., more preferably at least 50 g/l at 20° C. Even more preferably the water solubility of the preformed transition metal catalyst salt is at least 70 g/l at 20° C. and most preferably the salt is deliquescent. The high solubility provides for concentrates whilst avoiding precipitation or crystallisation of the preformed transition metal catalyst salt. The preformed transition metal catalyst salt (cationic) used in the method is most preferably a single species. In this regard, the aqueous solution used comprises at least 90% of a single species. The non-coordinating counter ions may, for example, be a mixture of acetate and chloride.

The non-coordinating anion of the transition metal catalyst salt is preferably selected from the group consisting of chloride, acetate, sulphate, and nitrate. Most preferably the salt is acetate. The salt is other than the perchlorate.

Co-ordinating counter ions for the transition metal complexes are $O^{2-}$ and/or carboxylate (preferably acetate). It is preferred that the transition metal complexes have at least one $O^{2-}$ co-ordinating counter ion. In particular, for $Me_3$-TACN three $O^{2-}$ co-ordinating counter ions are preferred or one $O^{2-}$ co-ordinating counter ion and two carboxylate co-ordinating counter ions are preferred, with two acetate moieties as co-ordinating counter ions being most preferred. For $Me_4$-DTNE two $O^{2-}$ co-ordinating counter ions and one acetate co-ordinating counter ion are preferred.

It is preferred that the transition metal catalyst salt is present in a buffer system that maintains the solution in the pH range 2 to 7, and preferably in the pH range 4 to 6. The buffer systems is preferably phosphate or carboxylate containing buffers, e.g., acetate, benzoate, citrate. The buffer system most preferably keeps the transition metal catalyst salt in the range pH 4.5 to 5.5.

The catalyst solution may also be provided in a reduced volume form such that it is in a concentrate, solid or slurry which is then dispatched to its place of use. Removal of solvent is preferably done by reduced pressure rather than the elevation of temperature. Preferably the solution, solid or slurry is stored over an inert atmosphere, e.g., nitrogen or argon, with little or no headspace at 4° C. For storage purposes a preformed transition metal catalyst salt concentration range of 0.1 to 10% is desirable, more desirable is between 0.5 and 8%, and most desirable is between 0.5 and 2%. The concentrate or solid or solid most preferably has the pH means as described above before reduction of water volume.

In the bleaching process it is preferred that the substrate is contacted with between from 0.1 to 100 micromolar of the preformed transition metal catalyst and from 5 to 1500 mM of hydrogen peroxide.

Preferably the preformed transition metal catalyst salt and hydrogen peroxide are mixed just before introduction to the substrate.

EXPERIMENTAL

Examples on the syntheses of $Mn_2O_3(Me_3\text{-TACN})_2$ complexes with different anions are provided. Synthesis of the $Mn_2O_3(Me_3\text{-TACN})_2 \, PF_6$ salt is disclosed in U.S. Pat. No. 5,153,161, U.S. Pat. No. 5,256,779, and U.S. Pat. No. 5,274,147. The solubility of the $Mn_2O_3(Me_3\text{-TACN})_2 \, PF_6$ salt in water at 20° C. is 1.08% (w/w).

Preparation of Aqueous Solution of $[Mn_2O_3(Me_3\text{-TACN})_2].(Cl)_2$

To 10 mmol (1.71 gram Me3-TACN in 10 ml water was added 10 mmol (1.98 gram) solid $MnCl_2.4H_2O$ while stirring under nitrogen flow. The mixture turned white/bluish. After 5 minutes stirring a freshly prepared mixture of 10 ml 1 M hydrogen peroxide and 2 ml of 5 M (20%) NaOH was added drop-wise over 5 minutes. The mixture turned immediately dark brown/red. At the end of the addition some gas evolution was observed. After completion of the addition the nitrogen flow was stopped and the stirring was continued for 5 minutes and pH was set with to neutral/acidic (pH 5 paper) with 1 M hydrochloric acid. The mixture was filtered through G4 glass frit, washed with water and the collected red filtrate and wash diluted to 50.00 ml in a graduated flask. From this solution a 1000× dilution was made and from the absorption in the UV/Vis spectrum at 244, 278, 313, 389 and 483 nm the concentration in the stock was calculated and the yield (based on extinction of the $PF_6$ analogue in water)

Extinction of 1000× diluted sample gave

| | |
|---|---|
| 244 nm | 1.692 |
| 278 nm | 1.619 |
| 313 nm | 1.058 |
| 389 nm | 0.108 |
| 485 nm | 0.044 |

Calculated yield 91%, solution contains 5.2% (on weight basis) of the catalyst.

Preparation of Aqueous Solution of [of $[Mn_2O_3(Me_3\text{-TACN})_2].(OAc)_2$

To 10 mmol (1.71 gram Me3-TACN in 10 ml water was added 10 mmol (2.47 gram) solid $MnCl_2.4H_2O$ while stirring under nitrogen flow. The mixture turned to a bluish solution.

After 5 minutes stirring a freshly prepared mixture of 10 ml 1 M hydrogen peroxide and 2 ml of 5 M (20%) NaOH was added drop-wise over 5 minutes. The mixture turned immediately dark brown/red. At the end of the addition some gas evolution was observed. After completion of the addition the nitrogen flow was stopped and the stirring was continued for 5 minutes and pH was set with to neutral/acidic (pH 5 paper) with 1 M acetic acid. The mixture was filtered through a G4 glass frit, washed with water and the collected red filtrate and wash diluted to 50.00 ml in a graduated flask. From this solution a 1000× dilution was made and from the absorption in the UV/Vis spectrum at 244, 278, 313, 389 and 483 nm the concentration in the stock was calculated and the yield (based on extinction of the $PF_6$ analogue in water)

| | |
|---|---|
| 244 nm | 1.689 |
| 278 nm | 1.626 |
| 313 nm | 1.074 |
| 389 nm | 0.124 |
| 485 nm | 0.051 |

Calculated yield 88%; solution contains 5.2% (on weight basis) of the catalyst.

Preparation of Aqueous Solution of $[Mn_2O_3(Me_3\text{-}TACN)_2]\cdot SO_4$

To 10 mmol (1.7 gram $Me_3$-TACN in 10 ml water was added 10 mmol (1.98 gram) solid $MnCl_2\cdot 4H_2O$ while stirring under nitrogen flow. The mixture turned to a white suspension. After 5 minutes stirring a freshly prepared mixture of 10 ml 1 M hydrogen peroxide and 2 ml of 5 M (20%) NaOH was added drop-wise over 5 minutes. The mixture turned immediately dark brown/red. At the end of the addition some gas evolution was observed. After completion of the addition the nitrogen flow was stopped and the stirring was continued for 5 minutes and pH was set with to neutral/acidic (pH 5 paper) with 1 M sulphuric acid. The mixture was filtered through a G4 glass frit, washed with water and the collected red filtrate and wash diluted to 50.00 ml in a graduated flask. From this solution a 1000× dilution was made and from the absorption in the UV/Vis spectrum at 244, 278, 313, 389 and 483 nm the concentration in the stock was calculated and the yield (based on extinction of $PF_6$ analogue in water)

| | |
|---|---|
| 244 nm | 1.648 |
| 278 nm | 1.572 |
| 313 nm | 1.022 |
| 389 nm | 0.103 |
| 485 nm | 0.042 |

Calculated yield 98%; solution contains 5.2% (on weight basis) of the catalyst.

Stability Experiments

Stability of aqueous solutions of chloride, sulphate and acetate salts are provided. Solutions of the bleach catalyst with chloride, sulphate and acetate anion were brought to pH 2, 3, 4 and 5 by hydrochloric acid, sulphuric acid and acetic acid respectively. For the acetate this could only give pH 5. For the lower pH values sulphuric acid was used in the case of acetate. The solutions were kept at 37° C. and after 2 weeks the stability was monitored from the absorptions in the UV/Vis spectra of 1000× diluted solutions.

2 Week Results at 37° C.

| Chloride | pH 2 | pH 3 | pH 4 | pH 5 |
|---|---|---|---|---|
| % (UV/Vis) | 100 | 100 | 97 | 94 |

(Precipitate is Formed at all pH's)

| Acetate | pH 2 | pH 3 | pH 4 | pH 5 |
|---|---|---|---|---|
| % (UV/Vis) | 87 | 91 | 93 | 95 |

(No Precipitate is Formed)

| Sulphate | pH 2 | pH 3 | pH 4 | pH 5 |
|---|---|---|---|---|
| % (UV/Vis) | 78 | 96 | 94 | 98 |

(Precipitate Only at pH=5)

For the two weeks results it is clear within experimental error (ca 5%) at pH 3 and higher no instability issue occurs.

Softwood chemical mill pulp obtained after the D0 bleaching stage (abbreviated as softwood D0 pulp) was used. The bleaching experiments were conducted on small scale in 100 ml vessels using the pulps at 5% consistency (i.e., 5% oven dry wood pulp; 95% aqueous bleaching liquor). The mixture contained 2.5 microM of the catalyst (as chloride, sulfate, acetate and $PF_6$ salts—see Table), 1 kg/t of $MgSO_4$, 8 kg/t of NaOH and 10 kg/t of $H_2O_2$ (kg/t: kg chemicals per ton oven dry pulp). The mixture was manually stirred to ensure good distribution of the bleaching chemicals. Then the vessel was placed in a water bath and stirred regularly at 50° C. for 1 h. All experiments were carried out at least 6 times. As a reference the experiment was conducted without catalyst. The dosages and exact reaction conditions are given in the sections below. After the allocated bleaching times the pulp batches were removed from the vessels, filtered using a Buchner funnel, and washed with 100 ml of water. From the resultant samples of bleached pulp 4×4 cm discs were made having a flat surface on one side. The softwood D0 pulp samples were dried using a L&W Rapid Dryer (Lorentzen and Wetter) at 90° C. for 20 minutes. Whiteness of the bleached pulps was determined using L, a*, b* values as defined by CIE (Commission Internationale de l'Eclairage) of the dried pad was measured using a Minolta spectrophotometer.

Results (all whiteness values show a standard deviation of 0.3 points.

| Complex | Whiteness |
|---|---|
| $[Mn_2O_3 (Me_3\text{-}TACN)_2]\cdot(PF_6)_2$ comparative example | 84.4 |
| $[Mn_2O_3 (Me_3\text{-}TACN)_2]\cdot Cl_2$ | 84.3 |
| $[Mn_2O_3 (Me_3\text{-}TACN)_2]\cdot(OAc)_2$ | 84.0 |
| $[Mn_2O_3 (Me_3\text{-}TACN)_2]\cdot SO_4$ | 84.1 |
| Blank (only $H_2O_2$) | 77.0 |

The data presented in the table show clearly that the bleaching effect is the same for all different catalyst-salt complexes.

What is claimed is:

1. An aqueous solution of a preformed transition metal catalyst salt, which salt is a mononuclear or dinuclear complex of a Mn(III) or Mn(IV) transition metal catalyst having a non-coordinating counter ion selected to provide a preformed transition metal catalyst salt that has a water solubility of at least 30 g/l at 20° C. and wherein the ligand of the transition metal catalyst is of formula (I):

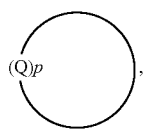
(I)

wherein:

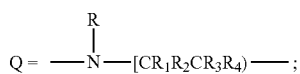

p is 3;
R is independently selected from: hydrogen, C1-C6-alkyl, CH2CH2OH, and CH2COOH, or one of R is linked to the N of another Q via an ethylene bridge; and
R1, R2, R3, and R4 are independently selected from: H, C1-C4-alkyl, and C1-C4-alkylhydroxy,
which aqueous solution is present in a buffer system that maintains the solution in a pH range of 2 to 5.

2. The solution of claim 1, wherein R is independently selected from: CH3, C2H5, CH2CH2OH and CH2COOH.

3. The solution of claim 1, wherein R1, R2, R3, and R4 are independently selected from: H and Me.

4. The solution of claim 1, wherein the catalyst is derived from a ligand selected from the group consisting 1,4,7-trimethyl-1,4,7-triazacyclononane and 1,2,-bis-(4,7,-dimethyl-1,4,7,-triazacyclonon-1-yl)-ethane.

5. The solution of claim 1, wherein the preformed transition metal catalyst salt is a dinuclear Mn(III) or Mn(IV) complex with at least one O2-bridge.

6. The solution of claim 1, wherein the preformed transition metal catalyst salt has a water solubility of at least 50 g/l at 20° C.

7. The solution of claim 6, wherein the salt is selected from the group consisting of chloride, acetate, sulphate, and nitrate.

8. The solution of claim 7, wherein the salt is acetate or sulphate.

9. The solution of claim 7, wherein the salt is acetate.

10. The solution of claim 1, wherein the buffer system maintains the solution in a pH range of 4 to 5.

11. The solution of claim 1, wherein the buffer system is a phosphate- or carboxylate-containing buffer.

12. The solution of claim 11, wherein the buffer system is an acetate, benzoate or citrate buffer.

* * * * *

UNITED STATES PATENT AND TRADEMARK OFFICE
CERTIFICATE OF CORRECTION

PATENT NO. : 8,455,423 B2
APPLICATION NO. : 13/177458
DATED : June 4, 2013
INVENTOR(S) : Hage et al.

Page 1 of 1

It is certified that error appears in the above-identified patent and that said Letters Patent is hereby corrected as shown below:

In the Specification

In column 2 at line 21, Change "TRCN" to --TACN--.

In column 4 at line 21 (approx.), Change "-4 -" to -- -C4- --.

In the Claims

In column 10 at line 8, In Claim 4, Change "consisting" to --consisting of--.

Signed and Sealed this
Twenty-seventh Day of May, 2014

Michelle K. Lee
*Deputy Director of the United States Patent and Trademark Office*